US012516896B2

(12) United States Patent
Elledge (10) Patent No.: US 12,516,896 B2
(45) Date of Patent: Jan. 6, 2026

(54) DIRECT DRIVE FOR HVAC AIR DUCT CLEANING SYSTEM

(71) Applicant: Rotobrush International LLC, Grapevine, TX (US)

(72) Inventor: Robert E. Elledge, Grapevine, TX (US)

(73) Assignee: Rotobrush International LLC, Grapevine, TX (US)

( * ) Notice: Subject to any disclaimer, the term of this patent is extended or adjusted under 35 U.S.C. 154(b) by 550 days.

(21) Appl. No.: 17/151,131

(22) Filed: Jan. 16, 2021

(65) Prior Publication Data

US 2022/0228823 A1   Jul. 21, 2022

(51) Int. Cl.
*B08B 9/051* (2006.01)
*B08B 9/035* (2006.01)
*F28G 15/04* (2006.01)
*H02K 7/00* (2006.01)

(52) U.S. Cl.
CPC .............. *F28G 15/04* (2013.01); *B08B 9/035* (2013.01); *B08B 9/051* (2013.01); *H02K 7/003* (2013.01)

(58) Field of Classification Search
CPC .......... B08B 9/047; B08B 9/045; B08B 9/035
USPC ............ 15/304, 314, 329, 383; 134/21, 22.1
See application file for complete search history.

(56) References Cited

U.S. PATENT DOCUMENTS

| | | | |
|---|---|---|---|
| 3,027,588 A | 4/1962 | Bierstock | |
| 3,220,042 A | 11/1965 | Harrington, Sr. | |
| 3,449,003 A * | 6/1969 | Hunt | E03F 9/002 403/324 |
| 4,158,248 A | 6/1979 | Palmer | |
| 4,610,702 A | 9/1986 | Krantz | |
| 4,870,714 A * | 10/1989 | Miner | E01H 1/0809 15/327.5 |
| 4,984,329 A | 1/1991 | Wade | |
| 5,003,998 A | 4/1991 | Collett | |
| 5,317,782 A | 6/1994 | Matsuura et al. | |
| 5,400,863 A | 3/1995 | Richardson | |
| 5,472,514 A | 12/1995 | Grimsley | |
| 5,572,766 A | 11/1996 | Matsuura et al. | |
| 5,584,093 A | 12/1996 | Melendres | |
| 5,608,941 A | 3/1997 | Kleinfeld | |

(Continued)

FOREIGN PATENT DOCUMENTS

| | | |
|---|---|---|
| CA | 2670689 A1 | 1/2011 |
| GB | 2036544 A | 7/1980 |

(Continued)

OTHER PUBLICATIONS

Elledge, Robert; Reply and Amendment filed on Jun. 23, 2023 in related U.S. Appl. No. 17/317,091, filed May 11, 2021.

(Continued)

*Primary Examiner* — Tom Rodgers
(74) *Attorney, Agent, or Firm* — Robert H. Frantz (57) ABSTRACT

A improved drive mechanism for coupling a rotatable drive cable to a remote tool, especially for a heating/ventilating/air conditioning (HVAC) air duct cleaning system, having an angled inlet for connecting a remote tool via a rotatable cable, a cable connector guide aligned with the angled inlet for receiving a connection end of the rotatable cable, and a motor such as a brushless direct current (DC) motor with a direct-drive coupling to the connection end of the rotatable connector.

10 Claims, 5 Drawing Sheets

(56) References Cited

U.S. PATENT DOCUMENTS

| | | | |
|---|---|---|---|
| 5,655,256 | A | 8/1997 | Hendrix et al. |
| 5,735,016 | A | 4/1998 | Allen et al. |
| 5,813,089 | A | 9/1998 | Nolan et al. |
| 5,819,354 | A | 10/1998 | Alsono et al. |
| 6,014,790 | A | 1/2000 | Smith et al. |
| 6,026,538 | A | 2/2000 | Watanabe |
| 6,032,325 | A | 3/2000 | Smith |
| 6,279,197 | B1 | 8/2001 | Crutcher et al. |
| 6,372,052 | B1 | 4/2002 | Jones |
| 6,375,454 | B1 | 4/2002 | Vilarasau Alegre |
| 6,785,934 | B2 | 9/2004 | Bruno et al. |
| 7,191,489 | B1 | 3/2007 | Heath |
| 7,363,681 | B2 | 4/2008 | Durbin et al. |
| D570,058 | S | 5/2008 | Watson et al. |
| 7,426,768 | B2 | 9/2008 | Peterson et al. |
| 7,917,990 | B2 | 4/2011 | Moroz |
| 8,667,705 | B2 | 3/2014 | Shin et al. |
| 12,011,140 | B2 | 6/2024 | McCoy et al. |
| 2002/0074219 | A1 | 6/2002 | Crevling |
| 2003/0208877 | A1 | 11/2003 | Stanovich et al. |
| 2003/0229421 | A1 | 12/2003 | Chmura |
| 2004/0047935 | A1 | 3/2004 | Moss |
| 2004/0103630 | A1 | 6/2004 | Kitchen |
| 2005/0108846 | A1 | 5/2005 | Peterson |
| 2005/0109375 | A1 | 5/2005 | Peterson |
| 2005/0150075 | A1 | 7/2005 | Takemoto |
| 2006/0195994 | A1 | 9/2006 | Hung |
| 2006/0242783 | A1* | 11/2006 | Peterson ............... B08B 9/043 15/304 |
| 2008/0000040 | A1 | 1/2008 | Peterson |
| 2008/0189905 | A1 | 8/2008 | Peterson et al. |
| 2010/0060216 | A1 | 3/2010 | Woodward |
| 2010/0306954 | A1 | 12/2010 | Coscarella |
| 2011/0254477 | A1 | 10/2011 | Woodward |
| 2017/0224185 | A1 | 8/2017 | Smith et al. |
| 2019/0160907 | A1 | 5/2019 | Velazquez |
| 2020/0271478 | A1* | 8/2020 | Schmauder ............ B08B 9/047 |
| 2022/0362818 | A1 | 11/2022 | Elledge |

FOREIGN PATENT DOCUMENTS

| | | | |
|---|---|---|---|
| KR | 19980038019 | A | 8/1998 |
| KR | 100188518 | B1 * | 6/1999 |
| WO | 9500262 | A1 | 1/1995 |

OTHER PUBLICATIONS

USPTO; second Office Action mailed on Dec. 2, 2023 in related U.S. Appl. No. 17/317,091, filed May 11, 2021.

USPTO; Notice of Allowance and First Office Action mailed on Apr. 1, 2024 in related application U.S. Appl. No. 17/683,666, filed Mar. 1, 2022, by James Kevin McCoy et al., and assigned to Rotobrush Int'l LLC (currently co-assigned with present patent application).

USPTO; "Notice of Allowance and Issue Fee Due" in related U.S. Appl. No. 17/683,666, filed Mar. 1, 2022, by James Kevin McCoy, et al.

Quiñones, J.; "Design Challenges and Considerations for Brushless DC Motors and Their Drives"; Jun. 2025; retrieved Jul. 22, 2025 from https://www.qorvo.com/design-hub/white-papers/qorvo-design-challenges-considerations-for-brushless-dc-motors-and-drives-white-paper.

Google AI Overview; "Redesigning a product to switch from an AC motor to a DC brushless motor: a detailed look"; retrieved on Jul. 29, 2025 from https://www.google.com.

Van Ochten, Mitch; "Meeting the Challenges of AC-DC Converters for Industrial Applications", Jun. 7, 2022.

USPTO; first Office Action, mailed on Dec. 20, 2022, in related U.S. Appl. No. 17/317,091, filed May 11, 2021.

Elledge, R.; reply to first Office Action, submitted on Jun. 20, 2023, in related U.S. Appl. No. 17/317,091, filed May 11, 2021.

USPTO; second Office Action, mailed on Dec. 20, 2023, in related U.S. Appl. No. 17/317,091, filed May 11, 2021.

Elledge, R.; reply to second Office Action, submitted on Mar. 25, 2024, in related U.S. Appl. No. 17/317,091, filed May 11, 2021.

Elledge, R.; supplemental/corrected reply to second Office Action, submitted on Apr. 25, 2024, in related U.S. Appl. No. 17/317,091, filed May 11, 2021.

USPTO; third Office Action, mailed on Aug. 29, 2024, in related U.S. Appl. No. 17/317,091, filed May 11, 2021.

Elledge, R.; reply to third Office Action, submitted on Jan. 19, 2025, in related U.S. Appl. No. 17/317,091, filed May 11, 2021.

USPTO; fourth Office Action, mailed on Feb. 11, 2025, in related U.S. Appl. No. 17/317,091, filed May 11, 2021.

Machine translation of KR19980038019A (year 1998) from https://patents.google.com.

* cited by examiner

DIRECT DRIVE FOR HVAC AIR DUCT CLEANING SYSTEM

FIELD OF THE INVENTION

The present invention is directed, in general, to an air duct cleaning system and, more specifically, to an improved drive mechanism for an air duct cleaning system for removing dust and debris from air conditioning and heating ducts, dryer vent ducts, etc., of residential and commercial buildings.

BACKGROUND OF INVENTION

So called "house dust" is widely considered by experts to pose health hazards to persons with allergies, asthma, or respiratory disorders and diseases. House dust may contain dirt, textile fibers, pollen, hair, skin flakes, residue of chemical and household products, cat and dog dander, decaying organic matter, dust mites, bacteria, fungi, viruses, and a variety of other contaminants. Literally, pounds of house dust accumulate on vents and in ducts that comprise the ventilating systems of both residential and commercial buildings. This house dust is becoming increasingly more harmful as Americans spend a larger percentage of their waking hours indoors, often aggravating allergies of the inhabitants. Modern heating/ventilating/air conditioning (HVAC) systems typically incorporate air filters either just prior to the circulation fan of the systems or in the return ductwork. However, most often these filters comprise fiberglass or similar media that are reasonably effective against large debris, but are often inadequate in removing fine particulate matter, such as dust, dander, etc., from the circulated air. Such filters may trap as little as twenty percent of the particulate matter circulating in a ventilation system, allowing the remaining dust and debris to circulate in the household or work place. Additionally, it is not uncommon to encounter ductwork that has been improperly installed or maintained. These ducts frequently leak, allowing dust and debris from the duct surroundings to enter the ducts. Often this is a major contributor to duct contamination.

One known approach to remove accumulated debris in ventilation ducts has been to use a rotating brush at the end of a flexible vacuum hose that is fed into each duct from each register location. The hose is fed into an the ductwork of the HVAC system from one or more access points, and as the rotating brush agitates and knocks loose the accumulated debris, and very strong vacuum pulls the loose debris into the hose, through which it travels to the main unit where it is collected.

SUMMARY OF THE EXEMPLARY EMBODIMENTS OF THE INVENTION

Certain improvements are disclosed for a drive mechanism for coupling a rotatable drive cable to a remote tool, especially for a heating/ventilating/air conditioning (HVAC) air duct cleaning system, having an angled inlet for connecting a remote tool via a rotatable cable, a cable connector guide aligned with the angled inlet for receiving a connection end of the rotatable cable, and a motor such as a brushless direct current (DC) motor with a direct-drive coupling to the connection end of the rotatable connector.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF ONE OR MORE EXEMPLARY EMBODIMENT(S) OF THE INVENTION

The present inventor has recognized that existing drive mechanisms for providing rotational energy to the brush head of an HVAC air duct cleaning system fail to meet all needs in the present market place. In general, HVAC air duct cleaning systems known to be currently available provide a man-portable main unit which often is mounted on a wheeled cart due to their size and weight. Developing enough negative air pressure (vacuum) to forcefully draw in air from a 3" or 4" diameter hose of 35 feet or more in length requires considerable electric motor power. Those motors are heavy. Further, the main unit must provide some sort of rotational drive mechanism to a rotating cable which extends from the main unit, down the length of the hose section(s), and to the power brush head, where it is converted to rotating energy at the brush. In some known systems, the same electric motors which are used to develop the strong vacuum are also used to generate the rotational energy for driving the cable to the power brush head. This is known in at least one system to be accomplished by coupling one of several alternating current (NC) electric motors through a pulley-on-pulley arrangement to the main unit's hose cable connection.

However, the present inventor has realized that there are a number of performance short comings in such an A/C belt-driven system. For example, if the power brush head becomes jammed or in a bind to a degree greater than the force exerted on the rotating cable, the binding force can be transmitted back to the pulley-on-pulley coupling, and to the NC vacuum motor itself. This means that the NC vacuum motor will be slowed or even stalled, which generates a power consumption surge by the NC motor and a drop in vacuum pressure. The pulley-on-pulley coupling can be configured such that it slips at this level of binding and thereby allows the A/C motor to resume turning, albeit perhaps still at a reduced speed and a reduced vacuum generation.

Further, in at least one configuration, the pulley-on-pulley coupling can be provided with a clutch device which disengages the pulley from the armature of the NC motor when the binding or resisting force hits a particular threshold. While this is an effect design technique to release the motor from mechanical coupling to the jammed power brush head, it does nothing to help un-bind the power brush head.

As such, it requires considerable skill by the operator when pushing a power brush head through ductwork without visual observation of the brush's condition to listen to the A/C motor's operation, detect when a brush may be entering a bind, withdraw the hose slightly and reposition or rotate it, and then reattempt advancing the hose into the ductwork.

The present inventor has realized that there are a number of disadvantages to this approach, and have set about improving the overall usability of such HVAC air duct cleaning systems to allow them to be used effectively by both experienced and novice operators, to maintain a constant vacuum pressure regardless of the brush head's condition, to allow for greater control of the brush head's rotational speed independent of the vacuum pressure generated, and to allow for automation of many of the anti-stall, anti-bind functions traditionally implemented by experienced system operators.

Figure 2:
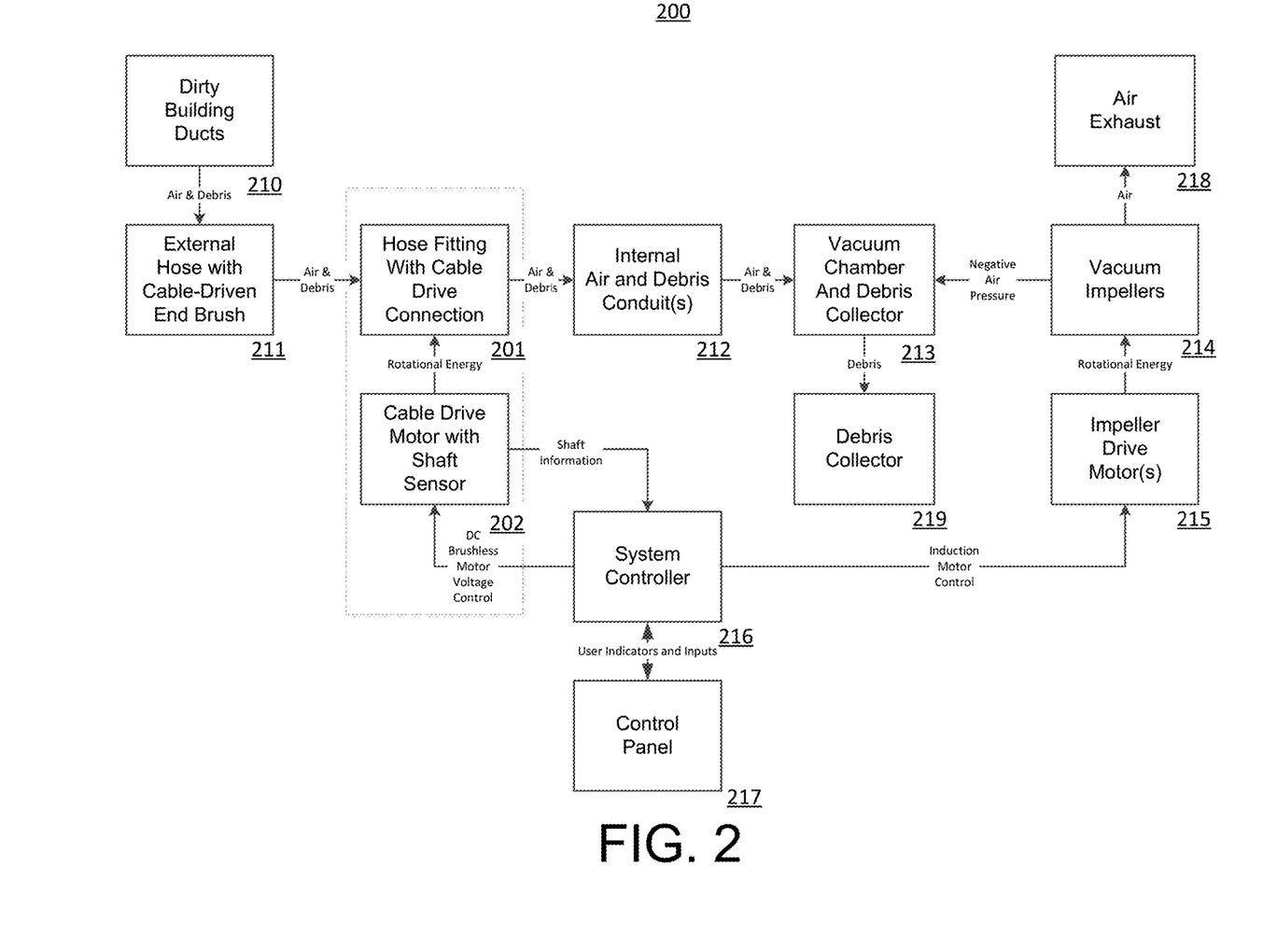
FIG. 2 provides a generalized functional block diagram of a conventional HVAC air duct cleaning system improved to include at least one example embodiment of the present invention.

Referring now to FIG. 2, a generalized functional block diagram is shown of an HVAC air duct cleaning system 200 incorporating the improvements according to the present invention. The present improvements will be readily employed in other systems of other configurations, so this generalized block diagram is provided as an example embodiment according to the invention, which is non-exhaustive of all other embodiments of the present invention to improve other HVAC air duct cleaning systems.

A main unit includes, generally, one or more impeller drive motors 215 which rotate one or more impellers 214 to generate a strong negative air pressure in a vacuum chamber 213 which air and debris are collected. The debris may be separated from the air in which it is suspended by a number of conventional means, such as but not limited to air filtration, cyclonic action, settling, etc., into a debris collector 219. The air, with most of the debris removed, is exhausted from the main unit via one or more vents or exhaust hoses 218.

The air and air-suspended debris are received from the dirty building ducts 210 through the external hose with the power brush head 211 via one or more internal air and debris conduit(s) 212. According to at least one embodiment of the present invention, the system is improved by providing a new brush head cable drive mechanism 202 including a direct current (DC) brushless motor which is separate and apart from the impeller drive motor(s), thereby achieving a first improvement by separating the vacuum power performance from the power brush head performance. If the power brush head gets slowed or bound to a stop, it will couple back to the new DC brushless motor, but will not interfere with the continued vacuum generation of the impeller drive motors, thereby maintaining full vacuum suction and keeping the collected debris aloft.

Still further, according to this particular example embodiment of the invention, the hose fitting, which is the interconnect between the external hose 211 and the main unit, is improved to receive the rotational energy developed by the new DC cable drive motor 202, with certain additional improvements in preferred embodiments which will be discussed in greater detail in the following paragraphs. The various available embodiment functions can therefore provide certain signals to a system controller 216, such as a microprocessor-based controller unit, and accompanied by certain control panel 217 improvements, which can, for example but not limited to, display the status of the power brush head, and the vacuum suction level of the system during operation. Further, while the system controller may be enabled to be dynamically capable of adjusting the control of the DC cable drive motor, it is also enabled, in some embodiments, to perform certain anti-stall and anti-bind functions automatically according to shaft movement feedback received from the cable drive motor 202. In some other embodiments, some or all of the additional control features may be omitted and still fall within the spirit and scope of the present invention of an improved direct drive mechanism for an HVAC air duct cleaning system.

Figure 1:
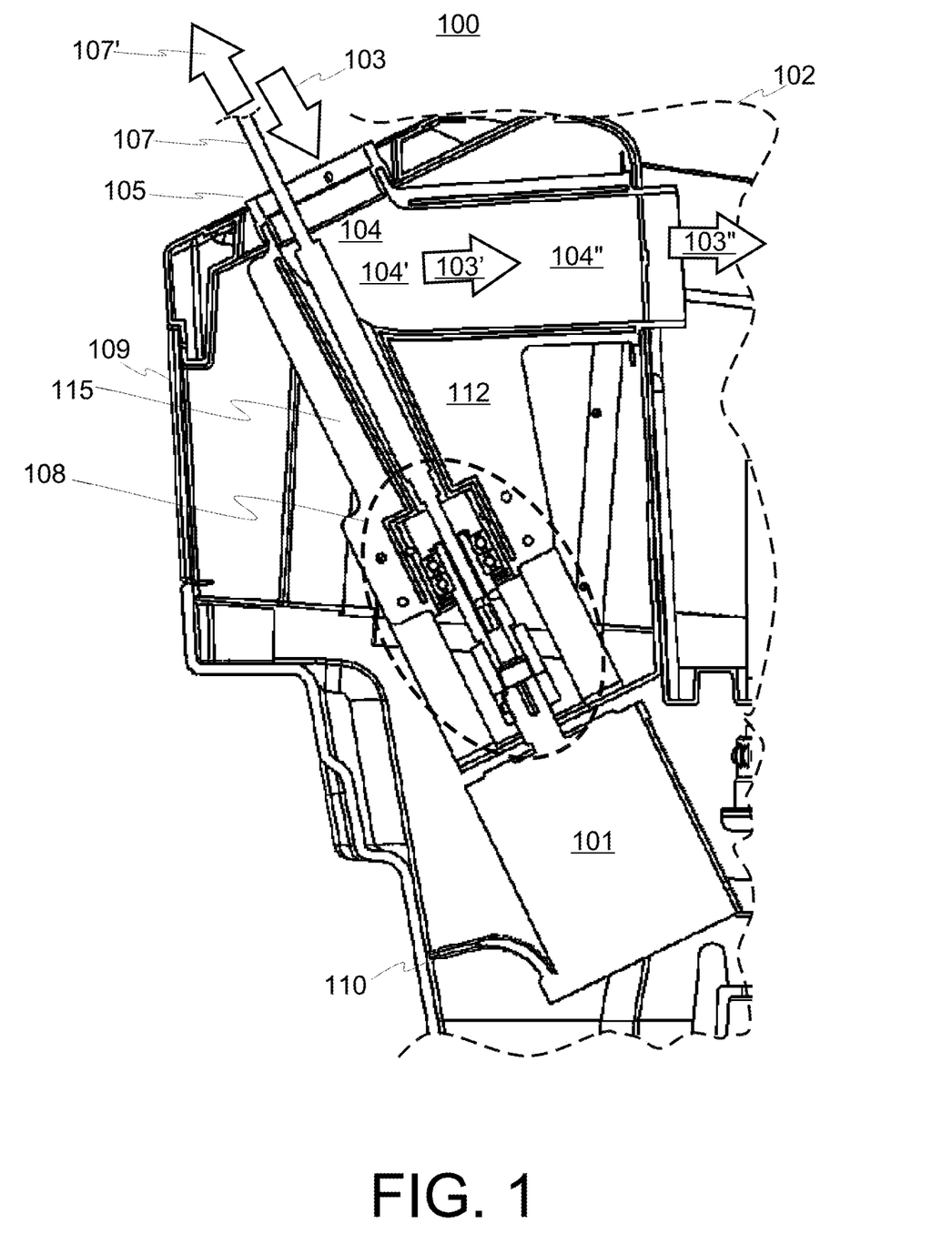
FIG. 1 provides a side cut-away view of an example embodiment of an improved drive mechanism according to the present invention.

Referring now to FIG. 1 which illustrates a cut-away side view of a portion 102 of a main unit for an improved HVAC air duct cleaning system according to at least one embodiment of the present invention. An external hose fitting 105 is provided on an external panel of the main unit, into which air and suspended debris 103 are pulled using the negative air pressure generated by the main unit. This air and suspended debris is received into at least a first portion of conduit 104 which provides a mechanical angle that generally points the connected hose in a 45 degree angle from horizontal (or from vertical), more or less, which facilitates directing of the hose into ducts which are often above waist or shoulder level of the operator.

The air flow, with suspended debris, is then transitioned in direction through an elbow portion 104' of the internal conduit to a generally horizontal direction of flow 103' through a generally horizontal portion 104" of the conduit towards 103" the air/debris separator and collector in the main unit. In at least this example embodiment, the cross-sectional area of the conduit remains fairly constant through the portions 104, 104' and 104", thereby inducing no considerable change in the velocity of the flow 103 of the air and suspended debris at the coupler 105 to the flow 103' following the elbow to the flow 103" into the air/debris separator and collector (not shown in this view).

In this improved cable drive sub-system 100, a DC brushless motor 101 is directly coupled 108 to the drive cable 107 for providing rotational energy 107' to the power brush head at the end of the attached external hose (not shown in this view). This drive cable is positioned within the hollow interior of the external hose, and a portion of the drive cable 107 extends from the end of the external hose far enough to be received into the coupling 108. Typically, the end of the cable is provided with a "stab-in" connector, such as a D-shaped rod which is received into a corresponding D-shaped reception cavity. In this particular example embodiment, the connection end of the drive cable is received into the drive mechanism 100 at an angle approximately perpendicular to the main unit's panel on which the hose connector 105 is mounted.

Still further in FIG. 1, it is shown that this example embodiment includes two structural reinforcement panels 112 and 115 which provide support between the two generally cylindrical portions of the unit 100, of which one of the cylindrical portions 104', 104" serves as an air and suspended debris conduit and the other cylindrical portion serves as a guide to receive the connection end of the drive cable 107 into the coupler 108. In this example configuration, the DC brushless motor 101 is mounted with its output armature or shaft in direct alignment with the coupled 108 connection end of the drive cable 107. This co-axial alignment of the motor output shaft to the drive cable minimizes energy lost which otherwise would occur in coupling arrangements that include pulleys, differentials or angle gear boxes. Electrical signal and power cables 110 receive power from the system controller 216, if present, and provide shaft rotation sensor information to the system controller 216, if present, where certain improved control methods may be performed as previously mentioned.

As illustrated in this particular example embodiment, several improvements are achieved and enabled by this direct-drive arrangement. First, as it is more compact with fewer components than prior designs using pulleys and belts, it enables the external connection to the cleaning hose to project from the main unit at an angle, rather than horizontally or vertically, which is better for most cleaning situations where the entry ducts are in a ceiling or along a top of a wall. Second, the conduit section which allows for insertion of the cable drive rotational energy into the plenum connected to the external hose has just one elbow or bend in it, thereby reducing cavitation and air flow velocity changes and keeping debris suspended in the moving air better. Third, the new drive mechanism is provided in such a manner that it can be connected to existing vacuum generation chambers of existing HVAC air duct cleaning systems, and requires no changes or upgrades to those other subsystems of legacy main units.

Fourth, by employing a brushless DC motor, more torque at lower speeds is provided to the power brush head at speeds which are independent of the vacuum-generating induction motor, thereby allowing for greater degrees of control and new automatic features not previously possible with the existing HVAC air duct cleaning systems.

Fifth, by employing a sensor to detect the status of the drive cable, and thereby the status of the DC motor and the power brush, such as a hall effect sensor or shaft encoder, a new system controller can be provided (or improved) to include new constant-power, anti-stall, auto-reverse, and auto-unjam features not possible with legacy systems.

Finally, existing 3" twist-lock external hoses with drive cables contained in their hollow interiors and existing air/debris separation subsystems such as a HEPA air filter can be used with the exemplary embodiment set forth in the foregoing paragraphs.

Figure 3:
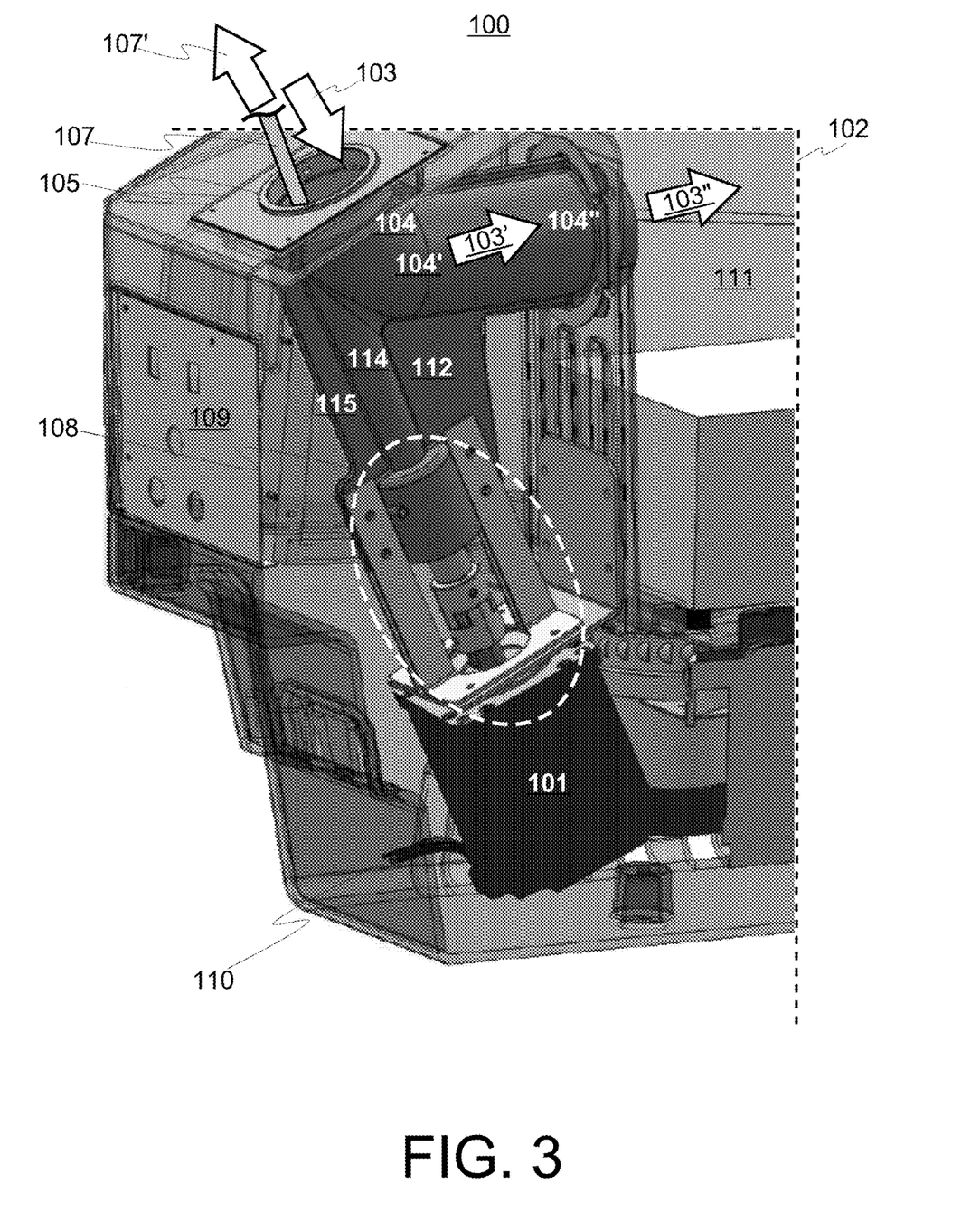
FIG. 3 depicts an angled view using three-dimensional shading of a portion of an HVAC air duct cleaning system main unit improved to include at least one example embodiment of the present invention.
Figure 4:
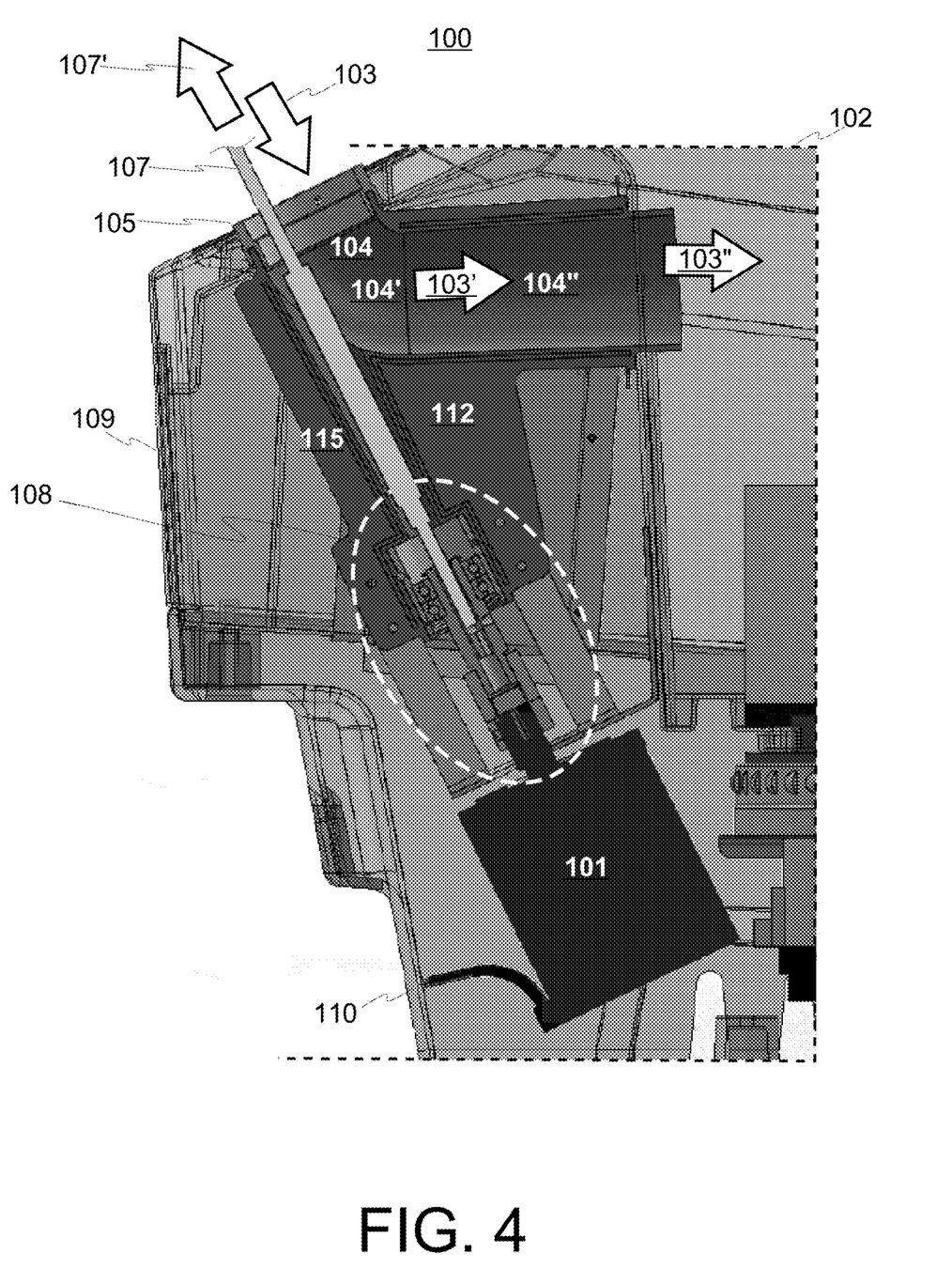
FIG. 4 illustrates a side cut-away view, similar to that of FIG. 1, except using three-dimensional shading of a portion of an HVAC air duct cleaning system main unit improved to include at least one example embodiment of the present invention.
Figure 5:
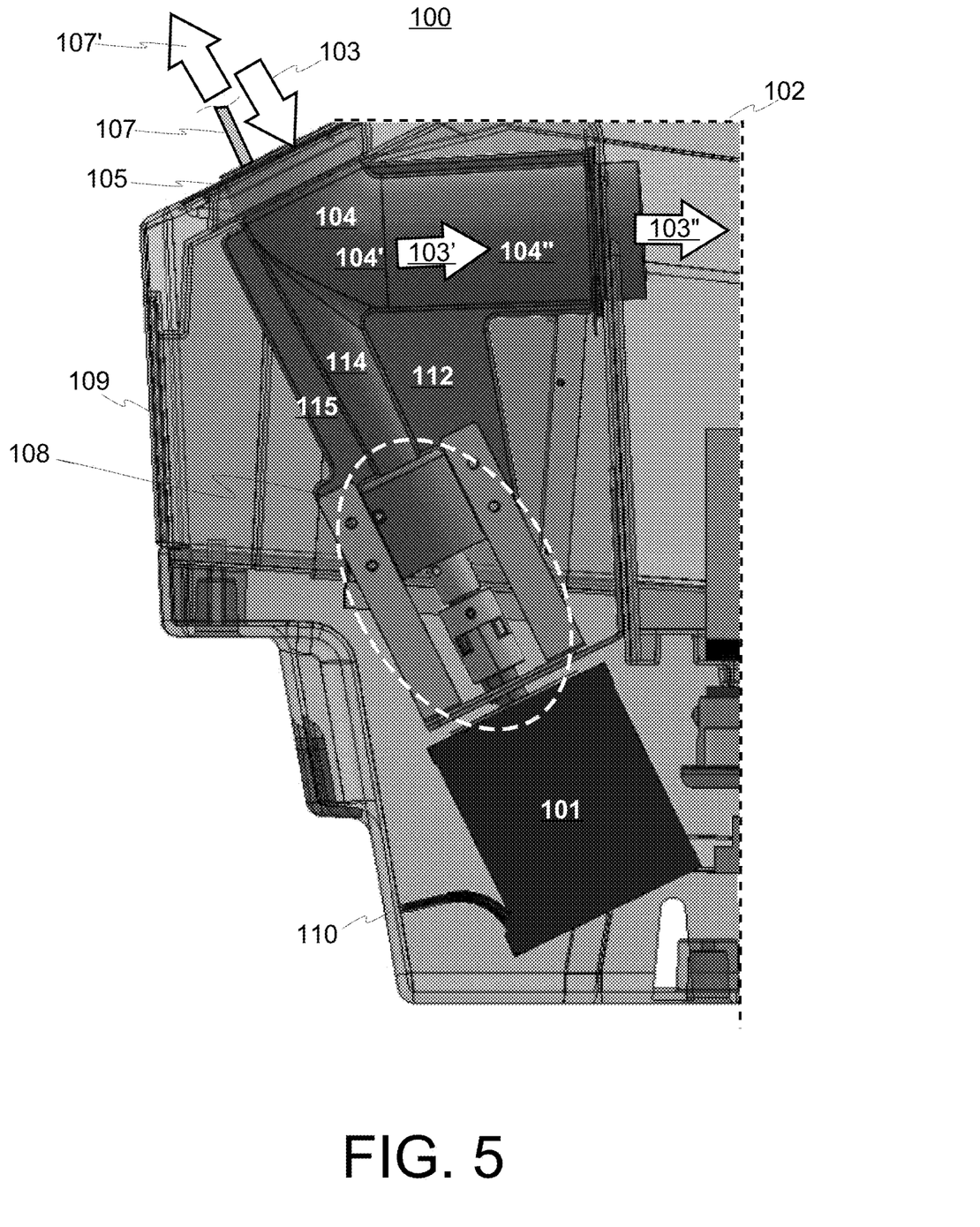
FIG. 5 illustrates a side solid view, similar to that of FIG. 1, except using three-dimensional shading of a portion of an HVAC air duct cleaning system main unit improved to include at least one example embodiment of the present invention.

FIGS. 3, 4 and 5 provide various views of the foregoing exemplary embodiment rendered with shading to represent three dimensional shapes of certain components and portions. In FIG. 3, a semitransparent main unit portion 102 is shown at a slight angle such that a control panel 109 is visible. The improved drive unit 100 is rendered in solid representation, including the support panels 112 and 115, the conduit portions 104, 104', and 104", and the cable coupling guide 114. The brushless DC motor 101 is mounted and coupled 108 (components within the dashed oval) in a co-axial alignment between the motor output shaft and the drive cable 107 connection end. Other elements of the legacy system are shown in various shades of gray.

FIG. 4 shows the same side-cutaway view as FIG. 1, except with a view into the interior of the conduit portions 104, 104', and 104"of the improved example embodiment 100 of a direct-drive subsystem. FIG. 5 is the same view as FIG. 4, except the conduit portions 104, 104', and 104" are rendered in solid representation.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Certain embodiments utilizing a microprocessor executing a logical process may also be realized through customized electronic circuitry performing the same logical process (es). The foregoing example embodiments do not define the extent or scope of the present invention, but instead are provided as illustrations of how to make and use at least one embodiment of the invention.

What is claimed is:

1. A drive mechanism for coupling a rotatable drive cable to a remote tool, comprising:
   a conduit having a first portion, a second portion, and one and only one elbow portion between the first portion and second portion, forming a continuous hollow plenum for the passage of air, wherein the first portion comprises an inlet opposite of the elbow portion, wherein the inlet and first portion are configured to receive an air duct cleaning hose at an approximate 45 degree angle from horizontal, and wherein the second portion is disposed to direct air flow in a generally horizontal direction towards an outlet to an air/debris separator and collector;
   a cable connector guide portion in mechanical alignment with the first portion of the conduit with a cable receiving orifice into the elbow portion of the conduit configured to receive a connection end of the rotatable drive cable;
   a brushless direct current motor having an output shaft; a coupler between the output shaft and the cable connector guide portion which is configured to transfer rotational energy from the output shaft to a connection end of a rotatable cable when received into the guide portion, wherein the coupler provides coaxial alignment between the guild portion and the output shaft;
   one or more structural reinforcement panels disposed in mechanical support of the brushless direct current motor and the cable guide connector portion to accommodate low-speed torque of the brushless direct current motor; and
   a sensor configured to sense movement of the output shaft, or to sense position of the output shaft, or to sense both movement and position of the output shaft, the shaft movement sensor having an output received by a controller which provides one or more control operations selected from the group consisting of constant brush power delivery, brush stall prevention, automatic brush rotation reversal, and automatic brush jam correction.

2. The drive mechanism as set forth in claim 1 wherein the conduit elbow portion is configured to form an approximate an angle of 115 degrees to 155 degrees, inclusive, between the conduit first portion and the conduit second portion.

3. The drive mechanism as set forth in claim 1 wherein the inlet of the first portion is further configured with a male portion of a twist-lock air duct cleaning hose connector.

4. The drive mechanism as set forth in claim 1 wherein the cable receiving orifice comprises a D-shaped reception cavity.

5. The drive mechanism as set forth in claim 1 wherein the conduit, the cable connector guide portion, the rotating motor and the coupler are configured to be received into a main unit of an air duct cleaning system wherein the second portion of the conduit interfaces to a vacuum generator of the main unit.

6. A method of manufacture of a drive mechanism for coupling a rotatable drive cable to a remote tool, comprising:

forming a conduit having a first portion, a second portion, and one and only one elbow portion between the first portion and second portion, thereby providing a continuous hollow plenum for the passage of air, wherein the first portion comprises an inlet opposite of the elbow portion, wherein the inlet and first portion are configured to receive an air duct cleaning hose at an approximate 45 degree angle from horizontal, and wherein the second portion is disposed to direct air flow in a generally horizontal direction towards an outlet to an air/debris separator and collector;

disposing to or on the conduit a cable connector guide portion in mechanical alignment with the first portion of the conduit with a cable receiving orifice into the elbow portion of the conduit configured to receive a connection end of a rotatable drive cable;

mounting a brushless direct current motor having an output shaft having a coupler, to transfer rotational energy from the output shaft to a connection end of the rotatable cable, wherein the mounting coaxially aligns the guide portion and the output shaft;

providing one or more structural reinforcement panels disposed in mechanical support of the brushless direct current motor and the cable guide connector portion to accommodate low-speed torque of the brushless direct current motor; and providing a sensor to sense movement of the output shaft, or to sense position of the output shaft, or to sense both movement and position of the output shaft, the shaft movement sensor having an output received by a controller which provides one or more control operations selected from the group consisting of constant brush power delivery, brush stall prevention, automatic brush rotation reversal, and automatic brush jam correction.

7. The method as set forth in claim 6 wherein the conduit elbow portion is configured to position the conduit first portion and the conduit second portion at an angle of 115 degrees to 155 degrees, inclusive, therebetween.

8. The method as set forth in claim 6 wherein the inlet of the conduit first portion is further configured with a male portion of a twist-lock air duct cleaning hose connector.

9. The method as set forth in claim 6 wherein the cable receiving orifice comprises a D-shaped reception cavity.

10. The method as set forth in claim 6 wherein the conduit, the cable connector guide portion, the rotating motor mount and the coupler are configured to be received into a main unit of an air duct cleaning system wherein the second portion of the conduit interfaces to a vacuum generator of the main unit.

* * * * *